(12) United States Patent
Sridharan et al.

(10) Patent No.: US 6,929,768 B2
(45) Date of Patent: Aug. 16, 2005

(54) METHOD OF MAKING A CATHETER BALLOON BY LASER FUSING WRAPPED MATERIAL

(75) Inventors: Srinivasan Sridharan, Morgan Hill, CA (US); Bjorn G. Svensson, Morgan Hill, CA (US)

(73) Assignee: Advanced Cardiovascular Systems, Inc., Santa Clara, CA (US)

( * ) Notice: Subject to any disclaimer, the term of this patent is extended or adjusted under 35 U.S.C. 154(b) by 423 days.

(21) Appl. No.: 10/144,978

(22) Filed: May 13, 2002

(65) Prior Publication Data

US 2003/0211258 A1 Nov. 13, 2003

(51) Int. Cl.$^7$ ............................................... B23K 26/00
(52) U.S. Cl. .................. 264/400; 264/482; 219/121.63; 219/121.64; 219/121.66; 219/121.82; 219/121.83
(58) Field of Search ................................. 264/400, 482; 219/121.63, 121.64, 121.66, 121.82, 121.83

(56) References Cited

U.S. PATENT DOCUMENTS

| | | | | |
|---|---|---|---|---|
| 5,454,881 A | * | 10/1995 | Fischer | 148/241 |
| 5,718,973 A | * | 2/1998 | Lewis et al. | 428/36.5 |
| 6,273,911 B1 | * | 8/2001 | Cox et al. | 623/1.1 |
| 6,395,208 B1 | * | 5/2002 | Herweck et al. | 264/127 |
| 6,620,190 B1 | * | 9/2003 | Colone | 623/1.1 |
| 2003/0180488 A1 | * | 9/2003 | Lim et al. | 428/35.2 |

OTHER PUBLICATIONS

Derwent Abstract 2001–581922, "High speed plastic pipe manufacture, rolls up edges of strip, overlaps, presses and cools them, employing laser and auxiliary heating sources", Bauchiere et al. (2001).*

* cited by examiner

Primary Examiner—Stefan Staicovici
(74) Attorney, Agent, or Firm—Fulwider Patton Lee & Utecht, LLP

(57) ABSTRACT

A method of making a catheter balloon or other expandable medical device, and a balloon or other device formed thereby, in which at least a portion of a tubular, wrapped sheet of polymeric material is heated with laser radiation to form a fused seam extending along at least a section of the length of the tubular body. In one embodiment, the portion of the sheet heated by laser radiation is less than the entire area of the sheet, so that the fused seam is formed by heating portions of the sheet without heating sections of the sheet spaced apart from the fused seam. In one embodiment, the sheet of polymeric material comprises a polymer having a porous and preferably a node and fibril microstructure, which in one embodiment is selected from the group consisting of expanded polytetrafluoroethylene (ePTFE) and expanded ultra high molecular weight polyethylene.

17 Claims, 3 Drawing Sheets

METHOD OF MAKING A CATHETER BALLOON BY LASER FUSING WRAPPED MATERIAL

BACKGROUND OF THE INVENTION

This invention generally relates to medical devices, and particularly to intracorporeal devices for therapeutic or diagnostic uses such as balloon catheters, and vascular grafts.

In percutaneous transluminal coronary angioplasty (PTCA) procedures, a guiding catheter is advanced until the distal tip of the guiding catheter is seated in the ostium of a desired coronary artery. A guidewire, positioned within an inner lumen of a dilatation catheter, is first advanced out of the distal end of the guiding catheter into the patient's coronary artery until the distal end of the guidewire crosses a lesion to be dilated. Then the dilatation catheter having an inflatable balloon on the distal portion thereof is advanced into the patient's coronary anatomy, over the previously introduced guidewire, until the balloon of the dilatation catheter is properly positioned across the lesion. Once properly positioned, the dilatation balloon is inflated with fluid one or more times to a predetermined size at relatively high pressures (e.g. greater than 8 atmospheres) so that the stenosis is compressed against the arterial wall and the wall expanded to open up the passageway. Generally, the inflated diameter of the balloon is approximately the same diameter as the native diameter of the body lumen being dilated so as to complete the dilatation but not over expand the artery wall. Substantial, uncontrolled expansion of the balloon against the vessel wall can cause trauma to the vessel wall. After the balloon is finally deflated, blood flow resumes through the dilated artery and the dilatation catheter can be removed therefrom.

In such angioplasty procedures, there may be restenosis of the artery, i.e. reformation of the arterial blockage, which necessitates either another angioplasty procedure, or some other method of repairing or strengthening the dilated area. To reduce the restenosis rate and to strengthen the dilated area, physicians frequently implant a stent inside the artery at the site of the lesion. Stents may also be used to repair vessels having an intimal flap or dissection or to generally strengthen a weakened section of a vessel. Stents are usually delivered to a desired location within a coronary artery in a contracted condition on a balloon of a catheter which is similar in many respects to a balloon angioplasty catheter, and expanded to a larger diameter by expansion of the balloon. The balloon is deflated to remove the catheter and the stent left in place within the artery at the site of the dilated lesion. Stent covers on an inner or an outer surface of the stent have been used in, for example, the treatment of pseudo-aneurysms and perforated arteries, and to prevent prolapse of plaque. Similarly, vascular grafts comprising cylindrical tubes made from tissue or synthetic materials such as polyester, expanded polytetrafluoroethylene, and DACRON may be implanted in vessels to strengthen or repair the vessel, or used in an anastomosis procedure to connect vessels segments together.

In the design of catheter balloons, characteristics such as strength, compliance, and profile of the balloon are carefully tailored depending on the desired use of the balloon catheter, and the balloon material and manufacturing procedure are chosen to provide the desired balloon characteristics. A variety of polymeric materials are conventionally used in catheter balloons. Use of polymeric materials such as PET that do not stretch appreciably consequently necessitates that the balloon is formed by blow molding, and the deflated balloon material is folded around the catheter shaft in the form of wings, prior to inflation in the patient's body lumen. However, it can be desirable to employ balloons, referred to as formed-in-place balloons, that are not folded prior to inflation, but which are instead expanded to the working diameter within the patient's body lumen from a generally cylindrical or tubular shape (i.e., essentially no wings) that conforms to the catheter shaft.

Catheter balloons formed of expanded polytetrafluoroethylene (ePTFE) expanded in place within the patient's body lumen without blow molding the ePTFE tubing have been disclosed. Prior methods of forming the ePTFE balloon involved wrapping a sheet of ePTFE on a mandrel and then heating the wrapped sheet in an oven to fuse the layers of wrapped material together. Heating the wrapped sheet in an oven will heat the entire sheet of ePTFE. One difficulty has been further processing of the tube by stretching the tube, after the layers of wrapped material are fused together.

It would be a significant advance to provide a catheter balloon with improved performance characteristics and ease of manufacture.

SUMMARY OF THE INVENTION

This invention is directed to a method of making a catheter balloon or other expandable medical device, and the balloon or other device formed thereby, in which a sheet of polymeric material is wrapped to form a tubular body, and at least a portion of the tubular body is heated with a localized heat source such as laser radiation to form a fused seam extending along at least a section of the length of the tubular body. In a presently preferred embodiment, the portion of the sheet heated by the localized heat is less than the entire area of the sheet, so that the fused seam is formed by heating portions of the sheet at the desired location of the fused seam without heating sections of the sheet spaced apart from the fused seam.

In a presently preferred embodiment, the expandable medical device is a balloon for a catheter. A balloon formed according to the method of the invention can be used on a variety of suitable balloon catheters including coronary and peripheral dilatation catheters, stent delivery catheters, drug delivery catheters, and the like. Although discussed below primarily in terms of the embodiment in which the medical device is a balloon for a catheter, it should be understood that other expandable medical devices are included within the scope of the invention including stent covers and vascular grafts.

In a presently preferred embodiment, the sheet of polymeric material comprises a polymer having a porous structure, which in one embodiment is selected from the group consisting of expanded polytetrafluoroethylene (ePTFE), ultra high molecular weight polyolefin, polyethylene, and polypropylene. In one embodiment, the porous material has a node and fibril microstructure. ePTFE and expanded ultra high molecular weight polyethylene typically have a node and fibril microstructure, and are not melt extrudable into tubular form. The node and fibril micro structure is produced in the material using conventional methods in which the material is heated, compacted, and stretched, as described in greater detail below. However, a variety of suitable polymeric materials can be used in the method of the invention including conventional catheter balloon materials which are melt extrudable. In one presently preferred embodiment, the polymeric material is not melt extrudable and is thus formed into a balloon by bonding wrapped layers of the polymeric material together.

In the method of the invention, the laser radiation is only applied at the desired location of the fused seam, so that the entire sheet of polymeric material does not have to be heated to fuse the layers of material together. Additionally, the laser radiation is applied at a specific power level to the selected area of the tubular body, to precisely heat the polymeric material to a desired temperature. By controlling the location and the power of the laser radiation, the method of the invention limits and controls the sintering of the polymeric material which would otherwise occur in materials such as ePTFE due to heating. Sintering ePTFE results in a change in crystal structure when the ePTFE is heated at or above its melting point of about 344° C. and allowed to cool, as described in McCluken, M., et al., Physical Properties and Test Methods for Expanded Polytetrafluoroethylene (PTFE) Grafts, Special Technical Publication 898, American Society for Testing and Materials (ASTM), pp. 82–84, 1987, incorporated by reference herein in its entirety. Specifically, after melting, the ePTFE recrystalizes to a different crystal structure having a lower melting point and lower strength. The sintered ePTFE has a higher stiffness. During formation of the fused seam in the method of the invention, only the sections of the ePTFE which form the fused seam are heated, and the other sections of the ePTFE tube are not heated and are therefore not sintered. As a result, subsequent processing such as for example stretching of the ePTFE tube is facilitated, because the stiffer sintered form of the ePTFE is only at the fused seam of the ePTFE tube, and a strong highly sintered fused seam is formed which holds together during such subsequent stretching of the ePTFE tube. In one embodiment, the tube of ePTFE is stretched to a greater degree after formation of the fused seam than would be possible if the entire tube was 100% sintered. As a result, the balloon has a decreased wall thickness, for example, of less than about 0.001 inch single wall thickness, and therefore an improved lower profile.

In the embodiment in which the polymeric material of the balloon has a node and fibril microstructure, after the fused seam is formed, the tube of polymeric material is typically stretched, sintered, compacted, and sintered a final time, to form the balloon. As discussed above, heating the desired area of the fused seam with laser radiation, sinters the polymeric material at the site of the fused seam. Thus, an intermediate product in the formation of the catheter balloon of the invention is a tube of polymeric material (e.g., ePTFE) having a fused seam, in which the polymeric material forming the fused seam is more highly sintered than the polymeric material forming sections of the sheet adjacent to the fused seam. During subsequent processing of the intermediate polymeric tube to form the balloon by heating and thereby sintering the polymeric material, the entire area of the tube is typically heated. In one embodiment, about 100% of the polymeric material of the finished balloon is sintered, as defined in the McClurken, M., et al. ASTM publication, incorporated by reference herein above. However, in alternative embodiments, the percent sintering is less than 100%, and preferably about 80% to less than 100%, and more specifically about 90% to less than 100%. As a result, in one embodiment, the polymeric material forming the fused seam is fully sintered and the polymeric material forming sections of the sheet adjacent to the fused seam is not fully sintered, i.e., partially unsintered or semi-sintered, so that the balloon comprises a wrapped sheet of polymeric material (e.g., ePTFE) having a fused seam, in which the polymeric material forming the fused seam is more highly sintered than the polymeric material forming sections of the sheet adjacent to the fused seam. The method of the invention provides for selective heating of the wrapped polymeric material due to the use of a laser or other localized heat source to heat the material. As a result, during formation of the fused seam, the sintering of the polymeric material which would otherwise occur in materials such as ePTFE is limited to the location of the fused seam. Moreover, the method provides for precise control over the temperature of the polymeric material during heat fusing to form the fused seam, and consequently over the sintering of the polymeric material at the fused seam. Additionally, heating the polymeric material with a laser to form the fused seam provides an improved reduced manufacturing time, and ease of manufacturing. These and other advantages of the invention will become more apparent from the following detailed description and accompanying exemplary FIGURES.

DETAILED DESCRIPTION OF THE INVENTION

Figure 1:
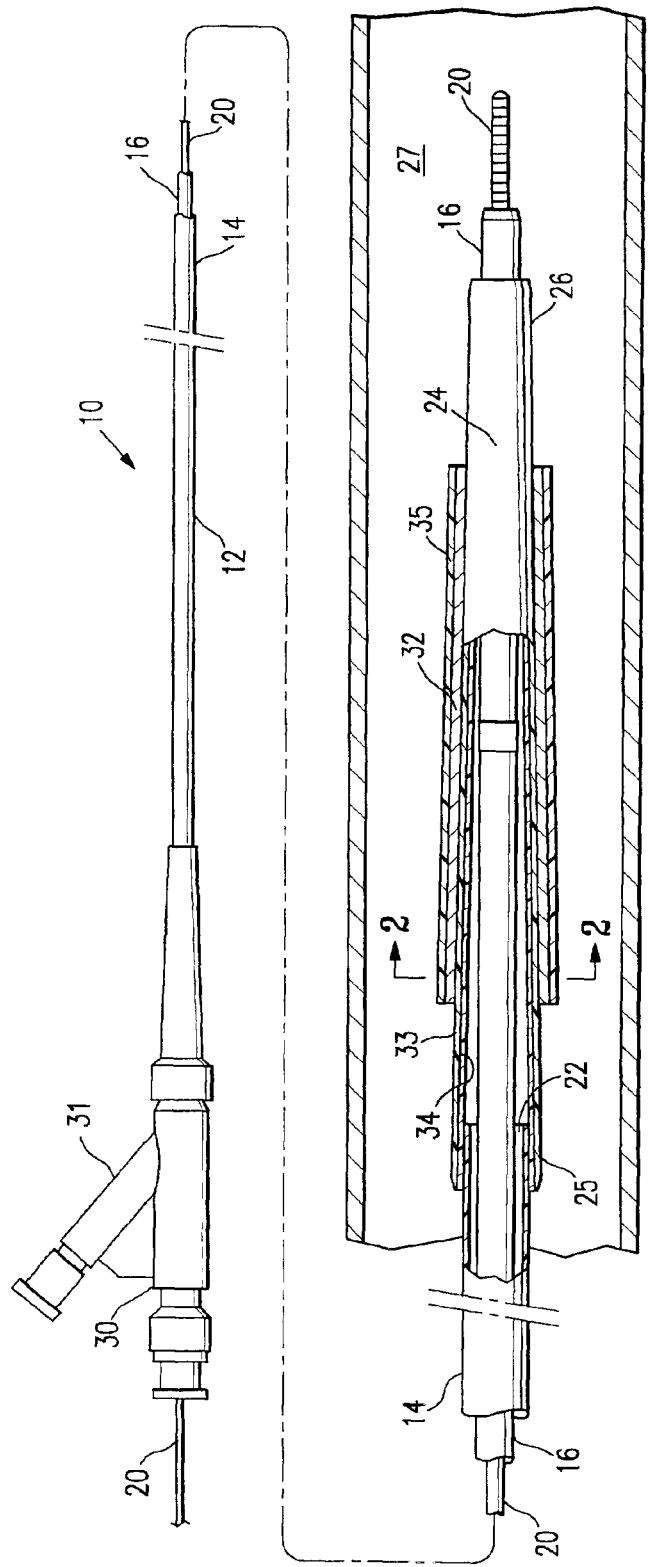
FIG. 1 is an elevational view, partially in section, of a stent delivery balloon catheter embodying features of the invention.
Figure 2:
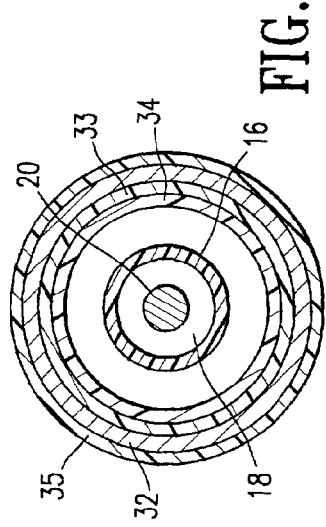
FIG. 2 is a transverse cross sectional view of the balloon catheter shown in FIG. 1, taken along line 2—2.

FIG. 1 illustrates an over-the-wire type stent delivery balloon catheter 10 embodying features of the invention. Catheter 10 generally comprises an elongated catheter shaft 12 having an outer tubular member 14 and an inner tubular member 16. Inner tubular member 16 defines a guidewire lumen 18 configured to slidingly receive a guidewire 20, as best illustrated in FIG. 2 illustrating a transverse cross section view of the distal end of the catheter shown in FIG. 1, taken along line 2—2. The coaxial relationship between outer tubular member 14 and inner tubular member 16 defines annular inflation lumen 22. An inflatable balloon 24 disposed on a distal section of catheter shaft 12 has a proximal skirt section 25 sealingly secured to the distal end of outer tubular member 14 and a distal skirt section 26 sealingly secured to the distal end of inner tubular member 16, so that its interior is in fluid communication with inflation lumen 22. An adapter 30 at the proximal end of catheter shaft 12 is configured to provide access to guidewire lumen 18, and to direct inflation fluid through arm 31 into inflation lumen 22. In the embodiment illustrated in FIG. 1, an expandable stent 32 is mounted on uninflated balloon 24, with an expandable stent cover 35 on the stent 32. In the embodiment illustrated in FIG. 1, the uninflated balloon 24 has a wingless, low profile configuration prior to inflation. The distal end of catheter may be advanced to a desired region of a patient's body lumen 27 in a conventional manner and balloon 24 may be inflated to expand stent 32, seating the stent 32 in the body lumen 27.

In the embodiment illustrated in FIG. 1, balloon 24 has a first layer 33 and a second layer 34. In a presently preferred embodiment, the balloon 24 has at least one layer comprising a microporous polymeric material, and preferably a microporous polymeric material having a node and fibril microstructure, such as ePTFE. In the embodiment illustrated in FIG. 1, first layer 33 is formed of ePTFE, and the second layer 34 is formed of a polymeric material preferably different from the polymeric material of the first layer 33. Although discussed below in terms of one embodiment in which the first layer 33 is formed of ePTFE, it should be understood that the first layer may comprise other materials including ultra high molecular weight polyethylene. The second layer 34 is preferably formed of an elastomeric material, including polyurethane elastomers, silicone rubbers, styrene-butadiene-styrene block copolymers, polyamide block copolymers, and the like. In a preferred embodiment, layer 34 is on the interior of balloon 24, although in other embodiments it may be on the exterior of the balloon 24. Layer 34 formed of an elastomeric material limits or prevents leakage of inflation fluid through the microporous ePTFE to allow for inflation of the balloon 24, and expands elastically to facilitate deflation of the balloon 24 to a low profile deflated configuration. The elastomeric material forming layer 34 may consist of a separate layer which neither fills the pores nor disturbs the node and fibril structure of the ePTFE layer 33, or it may at least partially fill the pores of the ePTFE layer.

Figure 3:
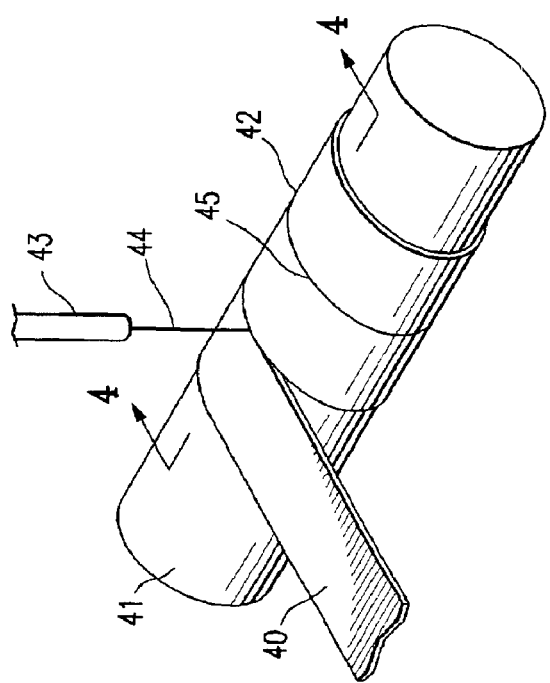
FIG. 3 illustrates the formation of a layer of the balloon of FIG. 1, in which the sheet of polymeric material is spirally wrapped around a mandrel and fused during wrapping.

The ePTFE layer 33 is formed according to a method which embodies features of the invention, in which a sheet of polymeric material is wrapped to form a tubular body and then heated to fuse the wrapped material together. In accordance with a method of the invention, the wrapped material is fused by heating at least a portion of the polymeric material with laser radiation to form a fused seam extending along at least a section of the length of the tubular body. FIG. 3 illustrates the formation of the ePTFE layer 33 of the balloon 24 of FIG. 1. In the embodiment of FIG. 3, a sheet 40 of polymeric material is spirally wrapped around a mandrel 41 to form a tubular body 42. A laser 43 emitting laser radiation 44 and the polymeric tubular body 42 are moved relative to one another, so that the laser radiation is applied to the spiral junction between sections of the wrapped sheet 40 to form fused seam 45. Although laser radiation 44 is illustrated at a perpendicular angle to the sheet 40, in one embodiment it may be tangential to the sheet 40, and particularly for the embodiment in which multiple layers of polymeric material are wrapped on the mandrel 41 as discussed below, to minimize the penetration of the laser heat into layers of material beneath the layer of material being heat fused. The laser radiation 44 is applied to the spiral junction along the length of the polymeric tubular body and around the circumference thereof to fuse the sections of the wrapped sheet 40 together. In the embodiment of FIG. 3, the laser follows the winding pattern of the sheet 40 as it is wrapped onto the mandrel, so that the laser radiation is applied during the wrapping of the sheet 40. For example, with the mandrel 41 rotating to wrap the sheet 40 onto the mandrel 41, the laser 43 is moved along the length of the wrapped polymeric material. In an alternative embodiment (not shown), laser radiation is applied to the wrapped polymeric material as a separate processing step after the wrapping of the sheet 40 onto the mandrel is completed.

Figure 4:
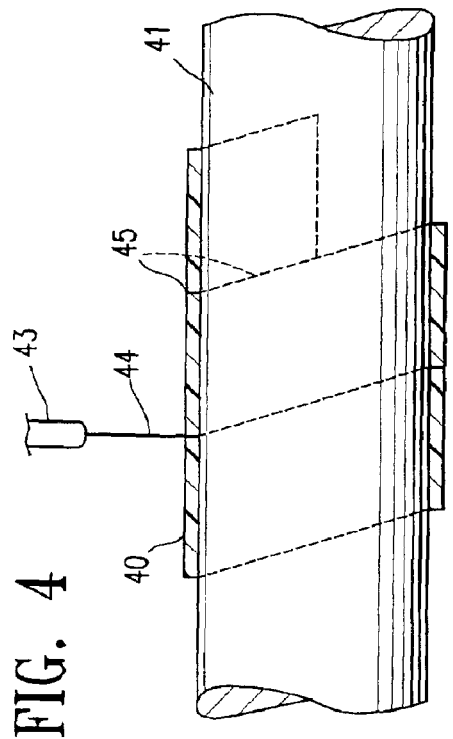
FIG. 4 is a partially in section view of the balloon shown in FIG. 3, taken along line 4—4, in which the sections of polymeric material about one another.
Figure 5:
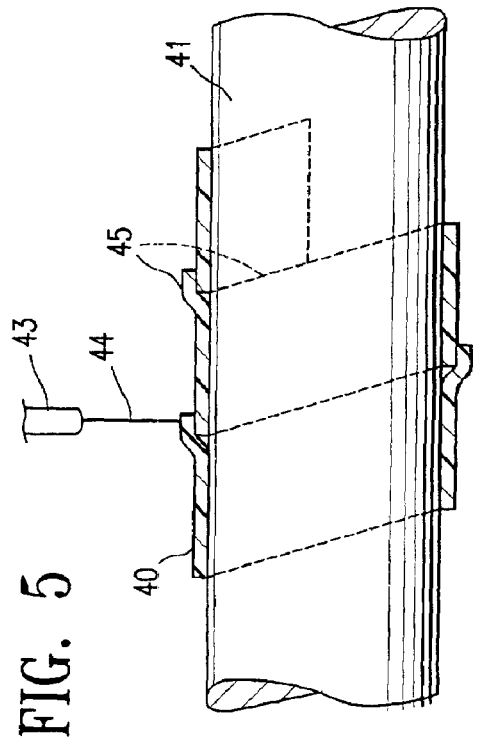
FIG. 5 is a partially in section view of an alternative embodiment of the balloon shown in FIG. 3, in which the sections of wrapped polymeric material overlap one another.

In the embodiment of FIG. 1, the sheet 40 is a long strip of polymeric material having longitudinal edges along the length of the strip which are longer than the width of the sheet 40. The sheet 40 is wrapped on the mandrel 41 so that the longitudinal edges of the sheet 40 are brought together in an abutting or overlapping relation. In the embodiment of FIG. 3, the fused seam 45 is formed by spirally extending edges of the wrapped sheet 40 which abut one another, as best illustrated in FIG. 4, showing a partial sectional view of the assembly of FIG. 3, taken along line 4—4. The laser radiation heats the abutting edges to form the fused seam 45, so that the fused seam 45 joins the abutting edges together. The abutting edges are easily held together in position during application of the laser radiation, so that the method provides improved ease of manufacture of an accurate fused seam. FIG. 5 illustrates an alternative embodiment in which the extending edge section of the wrapped sheet 40 overlaps the adjacent section of the wrapped sheet 40 so that the longitudinally adjacent section of the wrapped sheet has overlapping portions. The laser radiation heats the overlapping 20 portions to form the fused seam 45, so that the fused seam 45 joins the overlapping portions.

Figure 8:
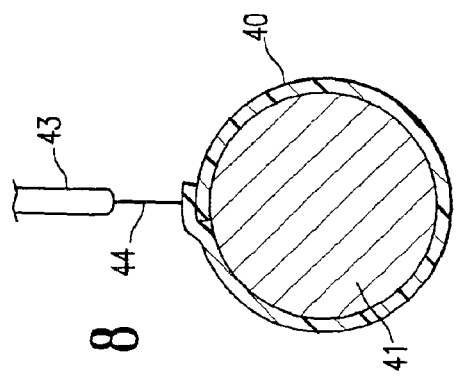
FIG. 8 is a transverse cross sectional view of an alternative embodiment of the sheet of polymeric material wrapped around the mandrel shown in FIG. 6, in which the sections of wrapped polymeric material overlap one another.
Figure 7:
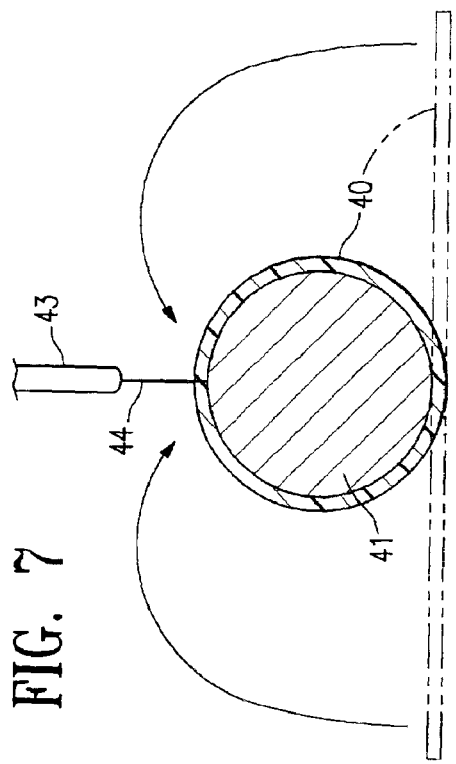
FIG. 7 is a transverse cross sectional view of the sheet of polymeric material wrapped around the mandrel shown in FIG. 6, taken along line 7—7, in which the sections of polymeric material abut one another.
Figure 6:
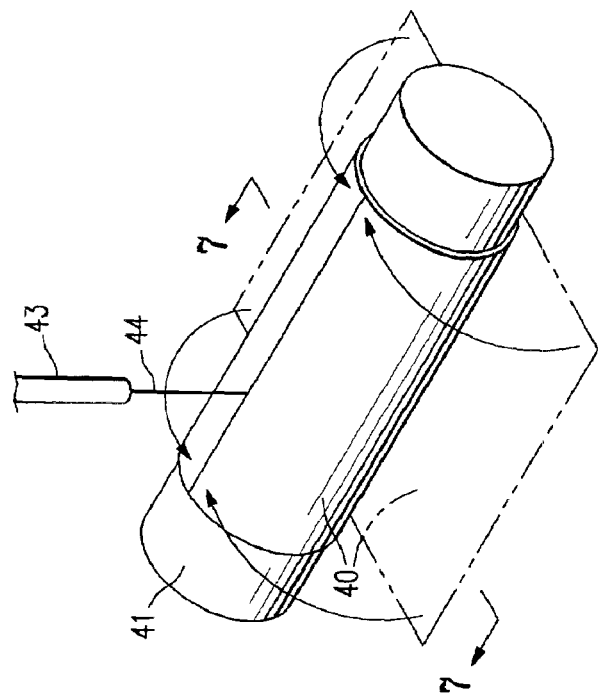
FIG. 6 illustrates an alternative embodiment of the formation of a layer of the balloon of FIG. 1, in which the sheet of polymeric material is wrapped around the mandrel by folding the sheet radially around the mandrel.

FIG. 6 illustrates an alternative embodiment in which the sheet 40 is wrapped around mandrel 41 by folding the sheet around the circumference of the mandrel so that the longitudinal edges of the sheet 40 extend in a substantially straight line along the length of the mandrel 41. FIG. 7 illustrates a transverse cross section of the assembly of FIG. 6, taken along line 7—7, showing the abutting longitudinal edges of the sheet 40. FIG. 8 illustrates an alternative embodiment in which the extending edge section of the wrapped sheet 40 overlaps the adjacent edge section of the wrapped sheet 40.

The sheet 40 of polymeric material is preferably wrapped along a length of the mandrel to form a single layer of wrapped material. Alternatively, multiple layers of polymeric material are wrapped on the mandrel, by for example, wrapping the sheet 40 down the length of the mandrel 41 to form a first layer and then back again over the first layer one or more times to form additional layers. In the embodiment having multiple layers of material, the laser radiation 44 is preferably applied as the sheet 40 is being wrapped on the mandrel. The multiple layers of material may be different materials with different heat fusing temperatures, in which case the laser radiation is preferably applied to each layer in turn at a different setting to produce the different heat fusion temperature for that specific material.

The sheet 40 is preferably a polymeric material having a microporous structure, which in one embodiment has a node and fibril structure, such as ePTFE. Thus, the sheet 40 has preferably been stretched to form the desired microstructure (e.g., porous and/or node and fibril) before being wrapped on the mandrel 41. In a presently preferred embodiment, the sheet 40 of ePTFE is semi-sintered before wrapping. The sheet 40 typically has a percent sintering of about 0% to about 80%, preferably about 20% to about 50%, of the polymeric material of the sheet 40, as defined in the McClurken, M., et al. ASTM publication, incorporated by reference above, before wrapping.

The laser radiation is applied to the wrapped material at a specific power and for a specific duration to control temperature of the heated portion of the polymeric material. The power level of the laser depends on variables such as the type and angle of the laser. The ePTFE polymeric material is heated by the laser radiation to a temperature of about 330° C. to about 380° C., which is above the crystalline melting temperature of the ePTFE. The heat spread during the heating of the ePTFE material is limited, so that the portion of the sheet 40 which is heated to thereby form the fused seam has a width of about 0.1 mm to about 1.0 mm, and preferably about 0.1 mm to about 0.5 mm. The heated ePTFE forming the fused seam has a different crystal structure than the adjacent sections of the ePTFE which were not heated during formation of the fused seam and which consequently are not completely sintered.

After the fused seam 45 is formed, the tubular body is typically further processed prior to being bonded to the layer 34 to form the balloon 24. Preferably, the tubular body is further processed by being stretched, sintered, compacted, and then sintered again, to provide the desired properties such as the desired dimension, and dimensional stability (i.e., to minimize axial shortening occurring during inflation of the balloon). For example, in one embodiment, the tubular body is longitudinally stretched to thereby increase the length of the tubular body by about 50% to about 200%. The controlled, localized delivery of heat to form the fused seam 45 facilitates the subsequent stretching of the tubular body. Although the heating of the ePTFE to form the fused seam results in a recrystallization of the ePTFE at the fused seam, the adjacent sections of the ePTFE tubular body are not sintered/recrystallized, and consequently are easier to stretch than the portions of the tubular body forming the fused seam. In one embodiment, the tensile strength of the tubular body after formation of the fused seam is about 2,000 psi to about 20,000 psi. Changes to other characteristics of the polymeric material, such as the porosity, melting point, strength and flexibility of the material are localized at the fused seam 45 during the fusing of the wrapped material together in the method of the invention. After the longitudinal stretching, the tubular body is preferably compacted and heated to further sinter the material, to provide the desired performance characteristics for balloon 24. In one embodiment, after the longitudinal stretching, the tubular body is heated to completely sinter the material, so that the percent of the polymeric material of the ePTFE layer 33 which is sintered is about 100%. The tubular body is typically heated in an oven at about 360° C. to about 380° C., or to at least the melting point of the ePTFE. In another embodiment, after the longitudinal stretching, the tubular body is incompletely sintered, so that the percent of the polymeric material of the ePTFE layer 33 which is sintered is about 80% or greater, or more specifically about 90% or greater, but less than 100%.

The completed ePTFE layer 33 is then combined with or bonded to the elastomeric liner 34 to complete the balloon 24, and the balloon 24 is secured to the catheter shaft 12.

The dimensions of catheter 10 are determined largely by the size of the balloon and guidewires to be employed, catheter type, and the size of the artery or other body lumen through which the catheter must pass or the size of the stent being delivered. Typically, the outer tubular member 14 has an outer diameter of about 0.025 to about 0.04 inch (0.064 to 0.10 cm), usually about 0.037 inch (0.094 cm), the wall thickness of the outer tubular member 14 can vary from about 0.002 to about 0.008 inch (0.0051 to 0.02 cm), typically about 0.003 to 0.005 inch (0.0076 to 0.013 cm). The inner tubular member 16 typically has an inner diameter of about 0.01 to about 0.018 inch (0.025 to 0.046 cm), usually about 0.016 inch (0.04 cm), and wall thickness of 0.004 to 0.008 inch (0.01 to 0.02 cm). The overall length of the catheter 10 may range from about 100 to about 150 cm, and is typically about 143 cm. Preferably, balloon 24 may have a length about 0.5 cm to about 6 cm, and an inflated working diameter of about 2 to about 10 mm.

Inner tubular member 16 and outer tubular member 14 can be formed by conventional techniques, for example by extruding and necking materials already found useful in intravascular catheters such a polyethylene, polyvinyl chloride, polyesters, polyamides, polyimides, polyurethanes, and composite materials. The various components may be joined using conventional bonding methods such as by fusion bonding or use of adhesives. Although the shaft is illustrated as having an inner and outer tubular member, a variety of suitable shaft configurations may be used including a dual lumen extruded shaft having a side-by-side lumens extruded therein. Similarly, although the embodiment illustrated in FIG. 1 is an over-the-wire stent delivery catheter, balloons of this invention may also be used with other types of intravascular catheters, such as rapid exchange dilatation catheters. Rapid exchange catheters generally comprise a distal guidewire port in a distal end of the catheter, a proximal guidewire port in a distal shaft section distal of the proximal end of the shaft and typically spaced a substantial distance from the proximal end of the catheter, and a short guidewire lumen extending between the proximal and distal guidewire ports in the distal section of the catheter.

While the present invention is described herein in terms of certain preferred embodiments, those skilled in the art will recognize that various modifications and improvements may be made to the invention without departing from the scope thereof. Moreover, although individual features of one embodiment of the invention may be discussed herein or shown in the drawings of the one embodiment and not in other embodiments, it should be apparent that individual features of one embodiment may be combined with one or more features of another embodiment or features from a plurality of embodiments.

What is claimed is:

1. A method of making an expandable tubular medical device or component thereof, comprising:
   a) spirally wrapping a sheet of polymeric material to form a tubular body having a length; and
   b) forming a fused seam extending along at least a section of the length of the tubular body by exposing a portion of the polymeric material to laser radiation to heat the portion of the polymeric material without heating sections of the polymeric material spaced apart from the portion of the polymeric material, wherein the laser radiation is first applied to the polymeric material before the wrapping of the sheet of polymeric material is completed so that a portion of the sheet is spirally wrapped after the laser radiation is first applied to the polymeric material.

2. The method of claim 1 wherein the width of the portion of the sheet heated with the laser radiation is about 1% to about 10% of the circumference of the tubular body.

3. The method of claim 2 wherein the fused seam has a width of about 0.1 mm to about 1 mm.

4. The method of claim 1 wherein the fused seam is formed by spirally extending edges of the sheet which abut oneanother, and forming the fused seam comprises heating the abutting edges so that the fused seam joins the abutting edges.

5. The method of claim 1 wherein fused seam is formed by a spirally extending edge section of the sheet which overlaps adjacent sections of the sheet so that longitudinally adjacent sections of the sheet have overlapping portions, and forming the fused seam comprises heating the overlapping portions so that the fused seam joins the overlapping portions.

6. The method of claim 1 wherein a) comprises wrapping the sheet on a mandrel by rotating the mandrel, and a laser providing the laser radiation is moved longitudinally along the mandrel during the wrapping of the sheet, so that the spirally extending fused seam is formed as the sheet is wrapped on the rotating mandrel to form the tubular body.

7. The method of claim 1 wherein wrapping the sheet comprises bringing longitudinal edges of the sheet together in an abutting or overlapping relation, so that the fused seam extends in a substantially straight line from a first end to a second end of the tubular body.

8. The method of claim 1 wherein the polymeric material is expanded polytetrafluoroethylene, and forming the fused seam comprises sintering the polytetrafluoroethylene polymeric material at the fused seam without sintering the polytetrafluoroethylene polymeric material forming sections of the sheet spaced apart from the fused seam.

9. The method of claim 1 wherein the polymeric material is expanded polytetrafluoroethylene and forming the fused seam sinters the polymeric material forming the fused seam, and including, after forming the fused seam, heating the entire tubular body to at least partially sinter the polymeric material.

10. The method of claim 1 wherein the medical device component is a catheter balloon and including, after forming the fused seam, longitudinally stretching the tubular body and thereby increasing the length of the tubular body by about 50% to about 250%.

11. A method of making a balloon for a catheter, comprising:

a) spirally wrapping a sheet of polymeric material to form a tubular body having a length; and b) forming a fused seam extending spirally along at least a section of the length of the tubular body by heating a portion of the polymeric material with laser radiation as the sheet is being spirally wrapped.

12. The method of claim 11 wherein forming the fused seam comprises heating the polymeric material at the fused seam without heating the polymeric material forming sections of the sheet spaced apart from the fused seam.

13. The method of claim 11 wherein the polymeric material is expanded polytetrafluoroethylene and forming the fused seam sinters the polymeric material forming the fused seam, and including, after forming the fused seam, heating the entire balloon to at least partially sinter the polymeric material.

14. The method of claim 13 wherein the balloon is heated at about 360° C. to about 380° C., so that 80% to less than 100% of the crystalline polymeric material forming sections of the sheet adjacent to the fused seam is sintered.

15. The method of claim 12 including, after forming the fused seam, longitudinally stretching the tubular body and thereby increasing the length of the tubular body by about 50% to about 250%.

16. The method of claim 1 wherein the laser radiation is applied tangential to the outer surface of the tubular body.

17. The method of claim 16 wherein wrapping the sheet comprises spirally wrapping the sheet in a first direction to form a first layer and in an opposite direction to form a second layer on an outer surface of the first layer, and the laser radiation is applied without heat fusing the outer layer and the inner layer together.

* * * * *